Patented May 12, 1925.

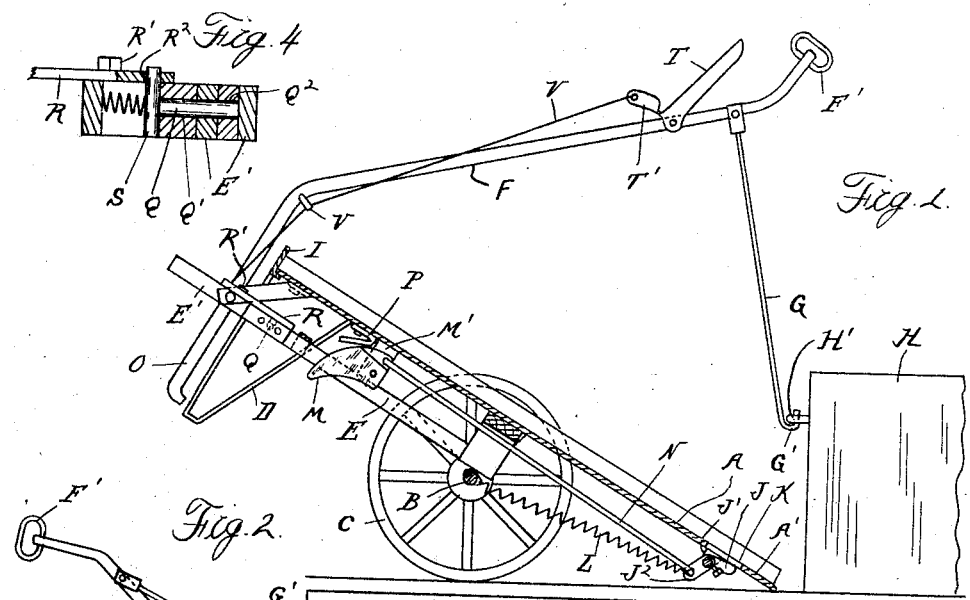
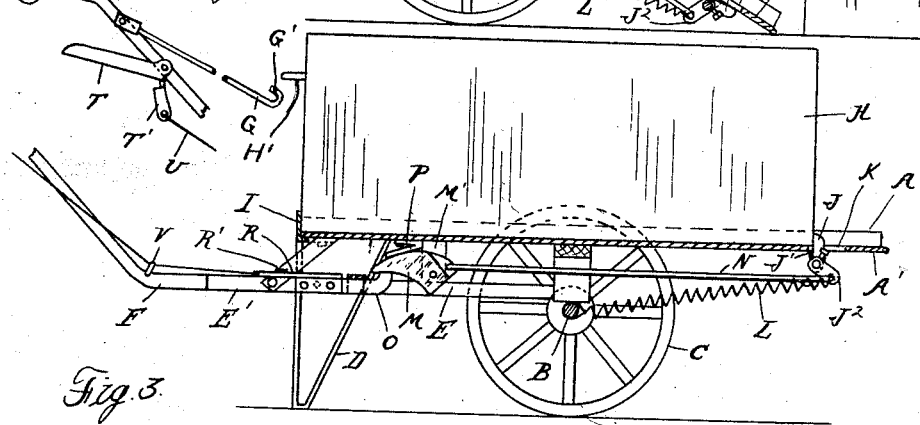
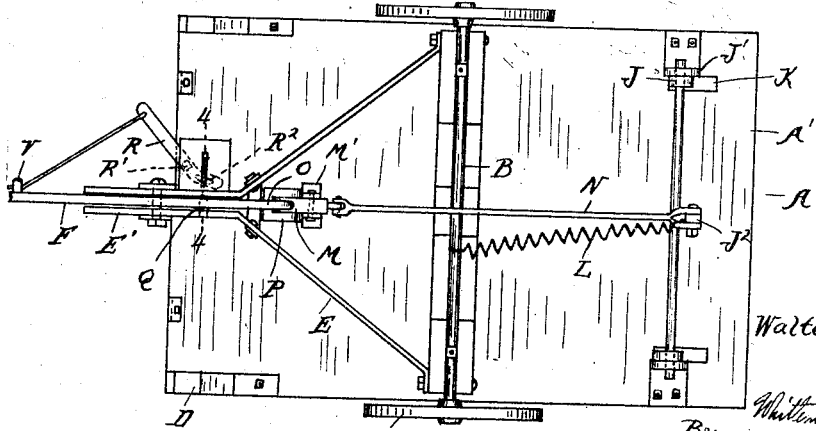

1,537,156

UNITED STATES PATENT OFFICE.

WALTER B. BAXTER, OF DETROIT, MICHIGAN.

TRUCK.

Application filed January 29, 1923. Serial No. 615,599.

*To all whom it may concern:*

Be it known that I, WALTER B. BAXTER, a citizen of the United States of America, residing at Detroit, in the county of Wayne and State of Michigan, have invented certain new and useful Improvements in Trucks, of which the following is a specification, reference being had therein to the accompanying drawings.

The invention relates to a novel construction in a truck which is particularly adaptable for transporting boxes of material in manufacturing establishments where the parts undergo a large number of operations. It is the usual practice to load such materials in boxes which must then be lifted upon a truck, but with my improved construction it is unnecessary to lift the material, but it can be drawn directly upon the platform.

To accomplish this end, I have provided the structure illustrated in the accompanying drawings, wherein—

Figure 1 is a sectional elevation of the truck in position to load a box of material;

Figure 2 is a similar view showing the box in position for transporting;

Figure 3 is a plan view of the under side of the truck;

Figure 4 is a section on line 4—4 of Figure 3.

A is a platform which is pivotally mounted upon an axle B provided with a pair of wheels C. The axle is placed approximately midway of the length of the platform, so that the latter is substantially in balance, and for normally supporting the truck in horizontal position there are provided the legs D at the forward end of the platform A. The bracket E is secured to the underside of the platform A and has a bifurcated portion E' extending forward from the same. A draft handle F is pivotally attached to the bifurcated bracket E and normally extends outward therefrom to form a suitable means for drawing the truck and the forward end of the handle is preferably bent upward to bring the grip F' at a convenient height. Pivoted near the outer end of the handle F is a rod G having at its free end a hook G' or other suitable means for engaging the material to be loaded on the platform. In loading the truck the platform is tilted until the outer end A' rests upon the floor and the handle F is swung backwards over the platform until the rod G is in position to hook onto a handle H' of a box H containing the material to be loaded. In this manner the box may be drawn upon the platform by a forward movement of the handle F and may be drawn far enough onto the platform to balance the truck.

To prevent the box from slipping off the forward end of the platform, there are the upstanding lugs I and at the opposite end of the platform there are the dogs J, which are pivotally mounted upon brackets J' secured to the under side of the platform. The numerals K represent slots in the platform, which are in alignment with the dogs J, so that the latter may project through the slots and form retaining means for the box when it is resting upon the truck. The dogs are normally held inoperative by the spring L secured at one end to the arms $J^2$ of the dogs J and at the opposite end to the axle B. For operating the dogs there is a cam M pivoted upon a bracket M' and connected to the arm $J^2$ by a rod N. The handle F is extended inwardly from the pivot forming the arm O, which engages with the cam M when the handle is in its forward position, thereby causing the lugs J to project through the platform.

A bracket P is secured to the under side of the platform A in alignment with the cam M and is so arranged that when the handle F is in its forward position, the cam M rests upon the bracket forming a stop which holds the arm O in alignment with the bifurcated bracket E'. A spring-pressed plunger Q is mounted in alignment with apertures Q' and $Q^2$, respectively, in the bifurcated bracket E' and the arm O, forming a spring catch for locking the handle in its forward position. For releasing the spring catch, a lever R is pivoted at R' to the platform A and cooperates by means of a slot $R^2$ with a laterally extending pin S attached to the plunger Q. A rocker lever T is pivoted upon the handle F and one arm T' is connected to the lever R by a flexible wire U and passes through rings V on the handle F. By operating the rocker arm T, the lever R is correspondingly rocked about its pivot R', thereby withdrawing the plunger Q against the action of the spring $Q^2$.

It will be seen that with the construction as described, I have provided a convenient form of truck which is adapted to load the material upon the platform and to automatically secure the same when the draft handle is in position for drawing the truck. In order to release the load it is only necessary to operate the lever T and tilt the platform A by lifting upward on the draft handle F. A slight pivotal movement of the handle F disengages the arm O from the cam M allowing the spring L to withdraw the retaining dogs J within the slots K and the weight of the load will then cause the box H to slide down the inclined platform. The reactive force will, therefore, slide the truck away from the box and deposit the latter wherever desired. When the truck is designed for transporting a particular size box the distance between the lugs I and the dogs J is made substantially equal to the length of the box and the distance between the axle B and the dogs J is made slightly greater than the distance between the axle and the lugs I. With this arrangement the weight of the handle F when in normal position will bring the center of gravity slightly forward of the axle B but as soon as the handle is raised for unloading the box the center of gravity is moved toward the rear of the truck thereby overbalancing the same and automatically causing it to be unloaded.

What I claim as my invention is:

1. A truck comprising a pair of wheels, a tilting platform centrally mounted on said wheels so as to be substantially in balance, a draft handle pivotally mounted on said platform, and a member pivotally secured to said handle and adapted to engage the load for drawing the same upon the platform when the latter is in tilted position.

2. A truck comprising a pair of wheels, a tilting platform centrally mounted on said wheels so as to be substantially in balance, a draft handle pivoted at one end of said platform, a spring catch normally holding said handle in position for drawing the truck, means for releasing said catch to allow said handle to be swung towards the opposite end of said platform, and a member pivotally secured to said handle and adapted to engage the load for drawing the same upon the platform.

3. A truck comprising a tilting platform supported by a pair of wheels, a draft handle pivotally mounted on said platform, a member pivotally secured to said handle and adapted to engage the load for drawing the same upon the tilted platform, and means operated by said handle for retaining the load upon the platform when the handle is in position for drawing the truck.

4. A truck comprising a tilting platform supported by a pair of wheels, a draft handle pivotally mounted on said platform, a member pivotally secured to said handle and adapted to engage the load for drawing the same upon the platform, means operated by said handle for retaining the load upon the platform when the handle is in position for drawing the truck, a spring catch normally holding said handle in said position, and means for manually releasing said catch.

5. A truck comprising a tilting platform supported by a pair of wheels, a bracket secured to one end of said platform, a draft handle pivoted to said bracket, a spring catch for locking said handle to said bracket when the handle is in alignment therewith, a lever upon said handle for releasing said catch, a hook pivoted upon said handle for drawing a load upon said platform, a retaining dog pivoted upon said platform, and means for rocking said dog operable by said handle.

6. A truck comprising a tilting platform supported by a pair of wheels, a draft handle pivotally mounted on one end of said platform, a retaining dog pivoted upon the opposite end thereof, and means operated by said handle causing said dog to project through said platform when said handle is in position for drawing the truck and to withdraw said dog upon upward movement of said handle.

7. A truck comprising a tilting platform supported by a pair of wheels, a draft handle pivoted to one end of said platform, a dog pivoted upon the opposite end of said platform and adapted to project therethrough to form a retaining means for the load, a cam for rocking said dog from inoperative to operative position, said cam being actuated by said lever when the latter is in position for drawing the truck, and a spring for withdrawing said retaining dog when said draft handle is moved about its pivot.

8. A truck comprising a wheeled tilting platform, an arm pivotally mounted on one end of said platform to swing in a vertical plane, means for normally holding said arm in a position to act as a draft handle, a link pivoted to the free end of said arm and provided with a hook for engaging a load to draw the same on said platform, a lug on the opposite end of said platform arranged to retain the load thereon when said arm is in draft position, and means operated by the pivotal movement of said arm for withdrawing said lug.

9. In a truck, the combination with a wheeled tilting platform, of a draft handle pivoted to one end of said platform, a stop on the opposite end of said platform arranged to prevent the sliding of the load from said platform, and means operated by a predetermined movement of said handle for automatically withdrawing said stop from said platform.

10. In a truck, the combination with a wheeled tilting platform, of a draft handle pivoted to one end of said platform, a load-retaining dog arranged at the opposite end of said platform to prevent the load from sliding from said platform when the handle is in draft position but adapted to be withdrawn from the path of said load by a predetermined movement of said handle.

11. In a truck, the combination with a wheeled tilting platform, of a lever pivoted to one end of said platform having an arm adapted for a draft handle, a member for retaining the load upon said platform pivoted thereto, a cam also pivoted to said platform, a link connecting said member with said cam, a spring normally holding said retaining member in inoperation position, and an arm upon said draft lever cooperating with said cam to hold said retaining member operative when said draft handle is in normal position.

In testimony whereof I affix my signature.

WALTER B. BAXTER.